Patented May 16, 1950

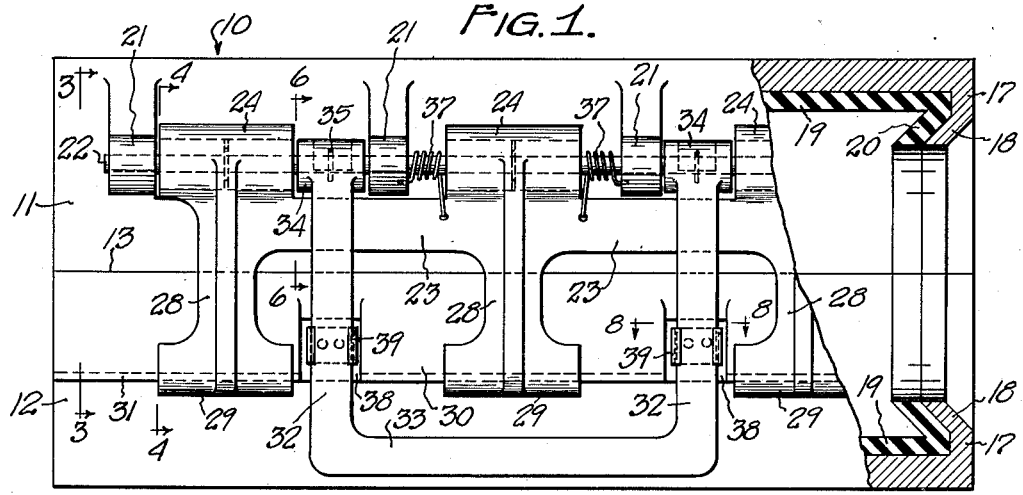

2,508,241

UNITED STATES PATENT OFFICE 2,508,241

HOSE JACKET

William J. Ferris, Wilmette, Ill.

Application May 31, 1946, Serial No. 673,654

10 Claims. (Cl. 138—99)

This invention relates to improvements in hose jackets. More particularly, the invention relates to a hose jacket constructed, adapted and intended primarily for use as an emergency repair for leaking fire fighting hose.

Previous constructions of hose jackets of this type have been characterized by locking means including hook elements which have been spring pressed into face engagement with the faces of shoulders which are substantially parallel to the parting plane of the jacket. In consequence, if a hook element strikes an obstruction, as while the hose is being drawn along the ground, the locking means could be accidentally released. Such release could result despite the provision on the jacket of secondary latching means commonly provided and associated with the operating handle of the device, because such secondary means are usually subject to release in the same direction as the hook elements. Thus, while the secondary latching means of prior devices have appeared to and been intended to act to supplement the above mentioned hook means, in other words to require release before the hook means could be released, they have not served this purpose in practice. Instead, the secondary latches have served only as a means to hold the handle stationary adjacent to the outer contour of the jacket in a position to minimize, but not fully prevent, the possibility of its engagement with and release by an obstacle. Furthermore, the arrangement of the parts in such prior devices has entailed the addition of parts which complicate the construction and make for difficulty of assembly and a high cost of production.

It is the primary object of the invention to provide a hose jacket with an improved locking hook construction which positively interlocks with a reversely disposed hook-like abutment so that it can be released only by a bodily movement of the hook member in an edgewise direction as distinguished from a simple swinging movement thereof.

A further object is to provide a hose jacket with a spring pressed eccentrically pivoted hook and a pivoted handle, wherein the swinging movement of the handle serves, at one selected portion of its range of travel, to bodily shift the hook lengthwise thereof, and at another portion of its range of travel to swing the hook.

A further object is to provide a hose jacket formed of longitudinally split pivotally connected sections with locking hooks releasable only by movement in a direction tangent to the jacket at the joint between the free edges of the jacket and operatively associated and controlled by a handle locked to the jacket for release in a direction substantially at right angles to the releasing movement of said hooks.

A further object is to provide a hose jacket of simple construction which is easy to assemble and comparatively inexpensive to produce.

Other objects will be apparent from the following description and specification.

In the drawing:

Fig. 1 is a side view of the device with parts broken away.

Fig. 2 is an end view of the device.

Fig. 3 is a fragmentary transverse sectional view taken on line 3—3 of Fig. 1.

Fig. 4 is a fragmentary transverse sectional view taken on line 4—4 of Fig. 1 and illustrating the latched position of the parts.

Fig. 5 is a view similar to Fig. 4 and illustrating the latch in a position clear of but adjacent to its latched position.

Fig. 6 is a fragmentary sectional view taken on line 6—6 of Fig. 1.

Fig. 7 is a view similar to Fig. 6, but illustrating a different adjustment of the parts.

Fig. 8 is a fragmentary detail sectional view taken on line 8—8 of Fig. 1.

Referring to the drawings, which illustrate the preferred embodiment of the invention, the numeral 10 designates a cylindrical hose jacket housing or sleeve which is open at its ends and is divided into two complementary parts 11 and 12 separated at a diametrical longitudinal parting plane 13. The two sleeve parts are provided with ears or lugs 14 and 15 projecting therefrom at one longitudinal edge in registering relation, and have axially aligned openings whose axis lies in the parting plane 13 and which receive a rod or pintle 16 which hingedly connects the parts or sections of the sleeve. At the ends of the sections 11 and 12 are provided integral inwardly projecting flanges 17 which terminate in return bent or inwardly extending conical portions 18, as best shown in Fig. 1, said flange portions 18 having an inner peripheral diameter substantially equal to the external diameter, when distended by water pressure, of the fire hose (not shown) of the size to which the jacket is designed to be applied. A two-part rubber liner 19 whose ends are flanged at 20, fits snugly within and conforms to the inner contour of the sleeve. The parts of the liner abut in edge engagement at the parting plane 13, and the application of pressure therein, as from water leaking from a hose, serves to press the edges of the liner sections into tight sealing engagement with each other and with the circumference of the hose at the peripheral edges of flanges 20. The sleeve 10 may be provided with suitable outwardly projecting ribs or reinforcements (not shown), as is well understood in the art, to strengthen the same.

A plurality of longitudinally spaced aligned lugs 21 project from one of the sleeve parts, as part 11, in spaced relation to the parting plane 13 of the sleeve, preferably being four in number and substantially equally spaced. The lugs have central longitudinal bores aligned with each other and spaced from the housing which journal a pivot rod 22.

A latching member having a longitudinally extending portion 23 and a plurality of lugs 24 projecting therefrom is connected to the sleeve 10 by the pivot rod 22. As best shown in Figs. 4 and 5, the lugs 24 have a large diameter bore formed therein and receive a cylindrical journal member 25 which in turn has an eccentric longitudinal bore within which the rod 22 fits snugly. A pin 26 extends radially through the rod 22 with its ends anchored in the member 25 to lock said rod and member against relative rotation. The lugs 24 are provided with bores 27, best seen in Fig. 5, which permit the insertion of the pins 26 to operative position after the assembly of the device, said bores 27 preferably being located in such a position that the pins 26 do not register therewith in the normal operative positions of the parts of the device. The latching member also includes a plurality of arms 28 formed integrally with and projecting laterally from the longitudinal part 23 thereof in the direction of the parting plane 13 and intersecting said plane when the sleeve is closed. The free ends of the arms 28 terminate in inwardly return bent or hook portions 29, as best seen in Figs. 2, 4 and 5.

The section of the sleeve opposite that to which the latching member is pivotally anchored, is provided at its free longitudinal edge portion with a longitudinal outwardly projecting rib or enlargement 30. This rib has an integral flange 31 formed at the outer portion of that longitudinal edge thereof which is remote or spaced from the parting plane 13. Flange 31 is so shaped and constructed that the hooks 29 may interlock therewith as shown in Figs. 2 and 4. In order to accommodate such interlocking hooked engagement, the latching member must be moved bodily edgewise to permit the free end of the hook 29 to clear the flange as the parts move toward locked engagement, and then to move into face engagement with and beneath said flange. Such movement of the latching member is provided by the eccentric or cam action of the members 25 which are journaled within the lugs 24, as illustrated in Figs. 4 and 5.

A U-shaped hand grip member having parallel arms 32 and cross-piece or handle 33 serves to operate the latching member. The ends of the arms 32 terminate in enlargements 34 having bores within which the pintle 22 fits snugly. A locking pin 35 passes diametrically through each enlargement 34 of the handle and the pins 22, so that pivotal movement of the handle unit relative to the hose jacket serves to rotate the pin 22. A nose portion 36 projects from the enlargement 34 at an angle to the arms 32 and extends toward the jacket 10 when the handle is in operative locking position, but is of a length to bear against the inner face of the part 23 when the handle is swung outwardly away from the jacket a predetermined extent. The arms 32 of the handle are preferably curved to follow the outer contour of the jacket when in locked position, as shown in Fig. 2.

Two or more coil springs 37 encircle the rod 22 at spaced points, as at opposite ends of the central lug 24 of the latching member. The opposite ends of these springs are anchored to adjacent lugs 21 and to the latching member, as at portion 23 thereof, respectively. These springs serve to normally urge the latching member toward its operative latching position, i. e., to pivot the member in a manner to swing the hooked arms 28 toward the jacket.

In order to permit the arms 32 of the handle to fit tight or snugly against the jacket, the rib 30 thereof is notched at points 38 to receive said arms. Within these notches are secured U-shaped spring retainers 39 adapted to embrace and grip the arms 32 when positioned within said notches.

In the use and operation of the device, assuming it to be in the locked position shown in Figs. 2 and 4, and that it is to be opened to condition it either for application to a hose or for removal from a hose, the handle is grasped, as at crosspiece 33, and is swung outwardly from the latching position in which it is held by the spring retainers 39. The pivotal movement of the handle is transmitted to the rod 22 by the locking pins 35 to rotate said rod through the same angle as the handle rotates. The eccentrically mounted or cam members 25 journaled in the lugs 24 of the latching member being pinned at 26 to the rod 22, likewise rotate with the handle. Consequently, initial releasing movement of the handle serves to rotate the eccentrics 25 from their locking position illustrated in Fig. 4 toward their releasing position illustrated in Fig. 5, thereby bodily shifting the latching unit tangentially of the jacket to permit disengagement of the hook members 29 from the flange 31. The nose or lug 36 of the handle is so positioned that it engages portion 23 of the latching unit when the latter has moved to its Fig. 5 release position. Further pivoting of the handle therefore serves to swing the latching unit away from the jacket as illustrated in Fig. 7, whereupon the jacket parts 11 and 12 are free to swing apart about the hinge pin 16. In other words, by a single simple operation of the handle, the jacket is released; and it is latched by the reverse sequence. This provides the advantage of a quick snap opening and closing of the jacket which is of great advantage in the emergency conditions under which the jacket is used, namely, upon occurrence of a hose leak while water is flowing in the hose, as in fighting a fire.

It will be noted that the seating of the terminus of the hooks 29 behind the flange 31 of the jacket, and the interrelated operation of the handle and the latching member, positively prevent release of the latching unit by engagement of the unit with an obstruction or by any condition except pivotal operation of the handle. It will be noted also that all of the parts fit snugly, that free play of parts is avoided, that no stress is exerted incident to the locking operation of a character to spread the jacket sections at the parting plane, and that the latching and retaining operation does not require play of the parts against the operation of any springs, except the spring retainers 39. These and other advantages render the device particularly well suited for its intended use.

It will be understood that, while the construction herein described and illustrated is preferred, the device may take other forms within the scope of the appended claims without departing from the spirit of the invention.

I claim:

1. A hose leak clamp comprising a longitudinally divided two-part sleeve, means for pivotally connecting said sleeve parts at one longitudinal edge thereof, a cam member rotatably mounted on one sleeve part, a latching member journaled on said cam and including an arm extending transversely of the longitudinal free margins of said sleeve parts and terminating in a hook portion, and a tangential flange portion projecting from the other sleeve part and interlockingly engageable by said hook portion.

2. A hose leak clamp comprising a longitudinally divided two-part sleeve, means for pivotally connecting said sleeve parts at one longitudinal edge thereof, a cam member rotatably mounted on one sleeve part, a latching member journaled on said cam and including an arm extending transversely of the longitudinal free margins of said sleeve parts and terminating in a return bent portion, and a flange portion projecting from the other sleeve part and interlockingly engageable by said return bent portion, and means for rotating said cam to accommodate bodily movement of said latching member between interlocking and released positions relative to said flange portion.

3. A hose leak clamp comprising a longitudinally divided two-part sleeve, means for pivotally connecting said sleeve parts at one longitudinal edge thereof, a cam member rotatably mounted on one sleeve part, a latching member journaled on said cam and including an arm extending transversely of the longitudinal free margins of said sleeve parts and terminating in a hook portion, and a projection on the other sleeve part interlockingly engageable by said hook portion, a handle pivoted to said first sleeve part and connected with said cam to rotate the same, and a retainer on said sleeve for releasably latching said handle in hook-engaging position snugly against said sleeve.

4. A hose leak clamp comprising a longitudinally divided two-part sleeve, means for pivotally connecting said sleeve parts at one longitudinal edge thereof, a cam member rotatably mounted on one sleeve part, a latching member journaled on said cam and including an arm extending transversely of the longitudinal free margins of said sleeve parts and terminating in a return bent portion, and an abutment projecting from the other sleeve part and interlockingly engageable by said hook portion, a handle pivoted to said first sleeve part and connected with said cam to rotate the same, means on said handle for engaging and swinging said latching member therewith after said cam has been rotated to a position to release said hook portions, and means for releasably locking said handle against said sleeve.

5. A hose leak clamp comprising a longitudinally divided two-part sleeve, means for pivotally connecting said sleeve parts at one longitudinal edge thereof, a cam member rotatably mounted on one sleeve part, a latching member journaled on said cam and including an arm extending transversely of the longitudinal free margins of said sleeve parts and terminating in a return bent portion, and a tangential flange portion projecting from the other sleeve part and interlockingly engageable by said hook portion, a handle pivoted to said first sleeve part and connected with said cam to rotate the same, means on said handle for engaging and swinging said latching member therewith after said cam has been rotated to a position to release said hook portion from said flange, spring means normally urging said latching member toward said sleeve, and a spring retainer on said sleeve for releasably latching said handle.

6. A hose leak clamp comprising a two-part longitudinally divided sleeve, means pivotally connecting said sleeve parts, lugs projecting from the free marginal portion of one sleeve part, a longitudinal rod journaled in said lugs, a cylindrical member mounted fixedly and eccentrically on said rod, a latching member journaled on said cylindrical member and extending substantially perpendicularly of said rod, a hook portion projecting from the marginal portion of the other sleeve part, said latching member including a return bent end portion adapted to interlock with said hook portion, and means for rotating said rod.

7. A hose leak clamp comprising a two-part longitudinally divided sleeve, means pivotally connecting said sleeve parts, lugs projecting from the free marginal portion of one sleeve part, a longitudinal rod journaled in said lugs, a cylindrical member mounted fixedly and eccentrically on said rod, a latching member journaled on said cylindrical member and extending substantially perpendicularly of said rod, a hook portion projecting from the marginal portion of the other sleeve part, said latching member including a return bent end portion adapted to interlock with said hook portion, a handle fixedly connected to said rod, and a spring clip on said sleeve for latching said handle.

8. A hose leak clamp comprising a two-part longitudinally divided sleeve, means pivotally connecting said sleeve parts, lugs projecting from the free marginal portion of one sleeve part, a longitudinal rod journaled in said lugs, a cylindrical member mounted fixedly and eccentrically on said rod, a latching member journaled on said cylindrical member and extending substantially perpendicularly of said rod, a hook portion projecting from the marginal portion of the other sleeve part, said latching member including a return bent end portion adapted to interlock with said hook portion, spring means normally pressing said latching member against said sleeve, and means for rotating said rod.

9. A hose leak clamp comprising a two-part longitudinally divided sleeve, means pivotally connecting said sleeve parts, lugs projecting from the free marginal portion of one sleeve part, a longitudinal rod journaled in said lugs, a cylindrical member mounted fixedly and eccentrically on said rod, a latching member journaled on said cylindrical member and extending substantially perpendicularly of said rod, a hook portion projecting from the marginal portion of the other sleeve part, said latching member including a return bent end portion adapted to interlock with said hook portion, spring means normally pressing said latching member against said sleeve, and means for rotating said rod, said last named means being adapted in a predetermined angular range of its movement to pivot said latching member.

10. A hose leak jacket comprising a two-part sleeve, means pivotally connecting the sleeve parts, a hook-like abutment projecting from the marginal portion of one sleeve part, a latching member carried by the other sleeve part and adapted to interlock with said abutment, and means having a predetermined range of movement and adapted to shift said latching means tangentially of said sleeve during a part of said movement and to swing said latching member laterally outwardly relative to said sleeve during the remainder of its movement in said range.

WILLIAM J. FERRIS.

REFERENCES CITED

The following references are of record in the file of this patent:

UNITED STATES PATENTS

| Number | Name | Date |
| --- | --- | --- |
| 549,594 | Cooper et al. | Nov. 12, 1895 |
| 948,772 | Shepard | Feb. 8, 1910 |